(12) United States Patent
Caleffi

(10) Patent No.: US 12,061,488 B2
(45) Date of Patent: Aug. 13, 2024

(54) DIAPHRAGM PRESSURE REDUCER

(71) Applicant: CALEFFI S.p.A., Novara (IT)

(72) Inventor: Marco Caleffi, Novara (IT)

(73) Assignee: Caleffi S.P.A., Novara (IT)

( * ) Notice: Subject to any disclaimer, the term of this patent is extended or adjusted under 35 U.S.C. 154(b) by 0 days.

(21) Appl. No.: 18/005,890

(22) PCT Filed: Jul. 13, 2021

(86) PCT No.: PCT/IB2021/056295
§ 371 (c)(1),
(2) Date: Jan. 18, 2023

(87) PCT Pub. No.: WO2022/018575
PCT Pub. Date: Dec. 7, 2022

(65) Prior Publication Data
US 2023/0315132 A1    Oct. 5, 2023

(30) Foreign Application Priority Data

Jul. 20, 2020   (IT) .................. 102020000017599

(51) Int. Cl.
*G05D 16/06* (2006.01)
*E03B 7/07* (2006.01)

(52) U.S. Cl.
CPC ......... *G05D 16/0661* (2013.01); *E03B 7/075* (2013.01); *G05D 16/0655* (2013.01)

(58) Field of Classification Search
CPC ............ G05D 16/0655; G05D 16/0661; E03B 7/075; Y10T 137/7794; F16K 24/06
See application file for complete search history.

(56) References Cited

U.S. PATENT DOCUMENTS

| 162,948 | A | * | 5/1875 | Pounds | G05D 16/0655 |
| | | | | | 137/505.41 |
| 2,208,261 | A | * | 7/1940 | Jackson | G05D 16/0647 |
| | | | | | 137/505.35 |
| 2,359,111 | A | * | 9/1944 | Hughes | G05D 16/0655 |
| | | | | | 137/71 |
| 2,871,879 | A | * | 2/1959 | Downe | G05D 16/0655 |
| | | | | | 251/117 |

(Continued)

FOREIGN PATENT DOCUMENTS

JP     2006318339 A    11/2006

*Primary Examiner* — Jessica Cahill
(74) *Attorney, Agent, or Firm* — LAUBSCHER & FRETWELL, PC

(57) ABSTRACT

A diaphragm pressure reducer has internally a shutter regulating the fluid passage between an inlet and an outlet; the shutter is pushed to open by a spring which is contrasted by an elastic diaphragm on which the fluid pressure acts to push the shutter to close; the diaphragm is placed between a first chamber in which the pressurized fluid is present that acts on the diaphragm and a second chamber communicating with the outside through an air vent passage; at the air vent passage an elastically deformable element is arranged that normally allows air to flow in the air vent passage, but in the event of rupture of the diaphragm through the thrust of the water pressure is deformed and moves so as to shut the aforesaid air vent passage and prevent water exiting the diaphragm pressure reducer.

5 Claims, 6 Drawing Sheets

(56) References Cited

U.S. PATENT DOCUMENTS

| | | | | |
|---|---|---|---|---|
| 3,062,525 A | * | 11/1962 | Schutmaat | G05D 16/0661 |
| | | | | 137/513.5 |
| 3,149,828 A | * | 9/1964 | Schutmaat | G05D 16/0655 |
| | | | | 411/972 |
| 3,746,263 A | * | 7/1973 | Reeder | F16K 15/04 |
| | | | | 137/533.15 |
| 4,074,694 A | * | 2/1978 | Lee | G05D 16/0658 |
| | | | | 137/505.38 |
| 9,658,625 B2 | * | 5/2017 | Peace | G05D 16/02 |
| 2004/0040600 A1 | * | 3/2004 | Cavagna | G05D 16/0402 |
| | | | | 137/505.11 |
| 2018/0086619 A1 | | 3/2018 | Newton et al. | |

* cited by examiner

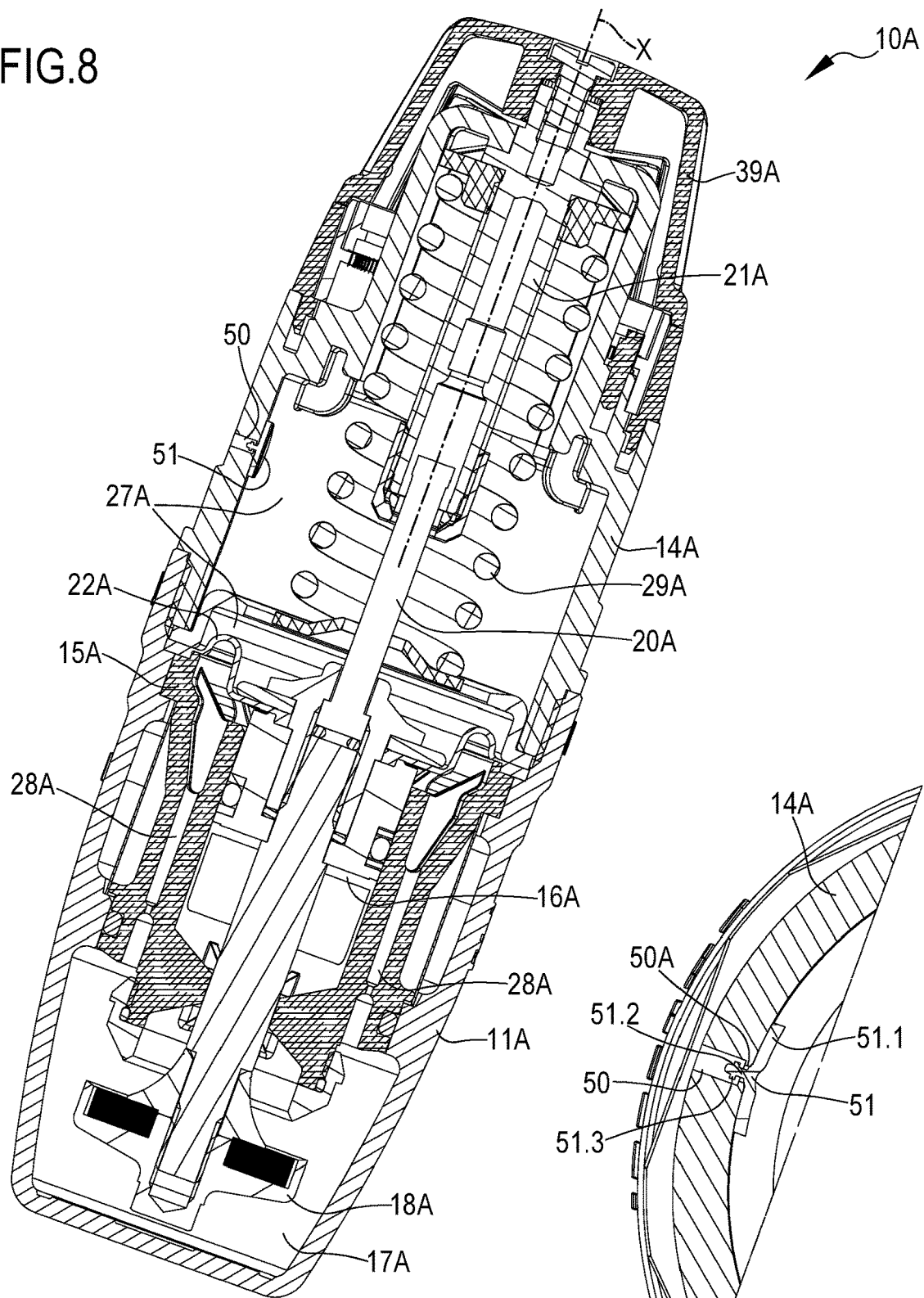

DIAPHRAGM PRESSURE REDUCER

BACKGROUND OF THE INVENTION

The object of the present invention is a diaphragm pressure reducer, intended to be mounted in a water system to adjust the pressure of the water in the system.

PRIOR ART

Diaphragm pressure reducers are known that are installed on the private water network to reduce and stabilize the pressure entering from the public network.

The pressure of the water coming from the public network is in fact normally too high and variable to be used correctly in domestic systems.

The pressure reducer has a shutter pushed to open by a spring which is contrasted by an elastic diaphragm on which the water pressure acts to push the shutter to close.

When a user is opened on the private water network, in the pressure reducer the force of the spring overcomes the contrary force of the diaphragm and the shutter moves to open for the passage of the water. The greater the demand for water, the greater will be the decrease of the pressure that acts on the diaphragm, thus determining a greater fluid passage through the shutter.

When the user is completely closed, the pressure downstream of the pressure reducer increases and the diaphragm pushes the shutter to the closed position, preventing the passage of the water and thus keeping the pressure of the water in the private water network constant at a set calibration value.

The diaphragm inside the body of the pressure reducer is interposed between two chambers and sealingly divides them. In a first chamber, the pressurized water that acts on the diaphragm is present, whereas air at atmospheric pressure is present in the second chamber. This second chamber communicates with the outside via a vent hole to avoid air being compressed therein, which would compromise the correct operation of the diaphragm.

In the accidental event of rupture of the diaphragm, however, water from the first chamber penetrates the second chamber through the diaphragm and exits to the outside through the vent hole, flooding the environment in which the pressure reducer is installed.

This rupture of the diaphragm can be caused mainly by overpressure of the water in the area of the diaphragm due for example to an increase in the water temperature in the private water network, or can also be caused by chemical corrosion because of the presence in the pressure reducer of substances used for example for disinfection.

In order to overcome this significant problem, some manufacturers use relief pressure systems for the overpressure of the water in the area of the diaphragm, using external devices like safety valves or anti water hammer valve or expansion tanks.

OBJECT OF THE INVENTION

The object of the present invention is to propose a diaphragm pressure reducer that is able to resolve the aforesaid problem when the external devices are missing or do not work.

SHORT DESCRIPTION OF THE INVENTION

This object is achieved by a pressure reducer of the diaphragm type.

SHORT DESCRIPTION OF THE DRAWINGS

In order to better understand the invention, a description of two non-limiting exemplary embodiments thereof is given below, illustrated in the attached drawings in which:

FIGS. 8,9 are views corresponding to the views of FIGS. 6,7, that show the pressure reducer of FIG. 6 in the situation of rupture of the diaphragm.

DETAILED DESCRIPTION OF THE INVENTION

Figure 1:
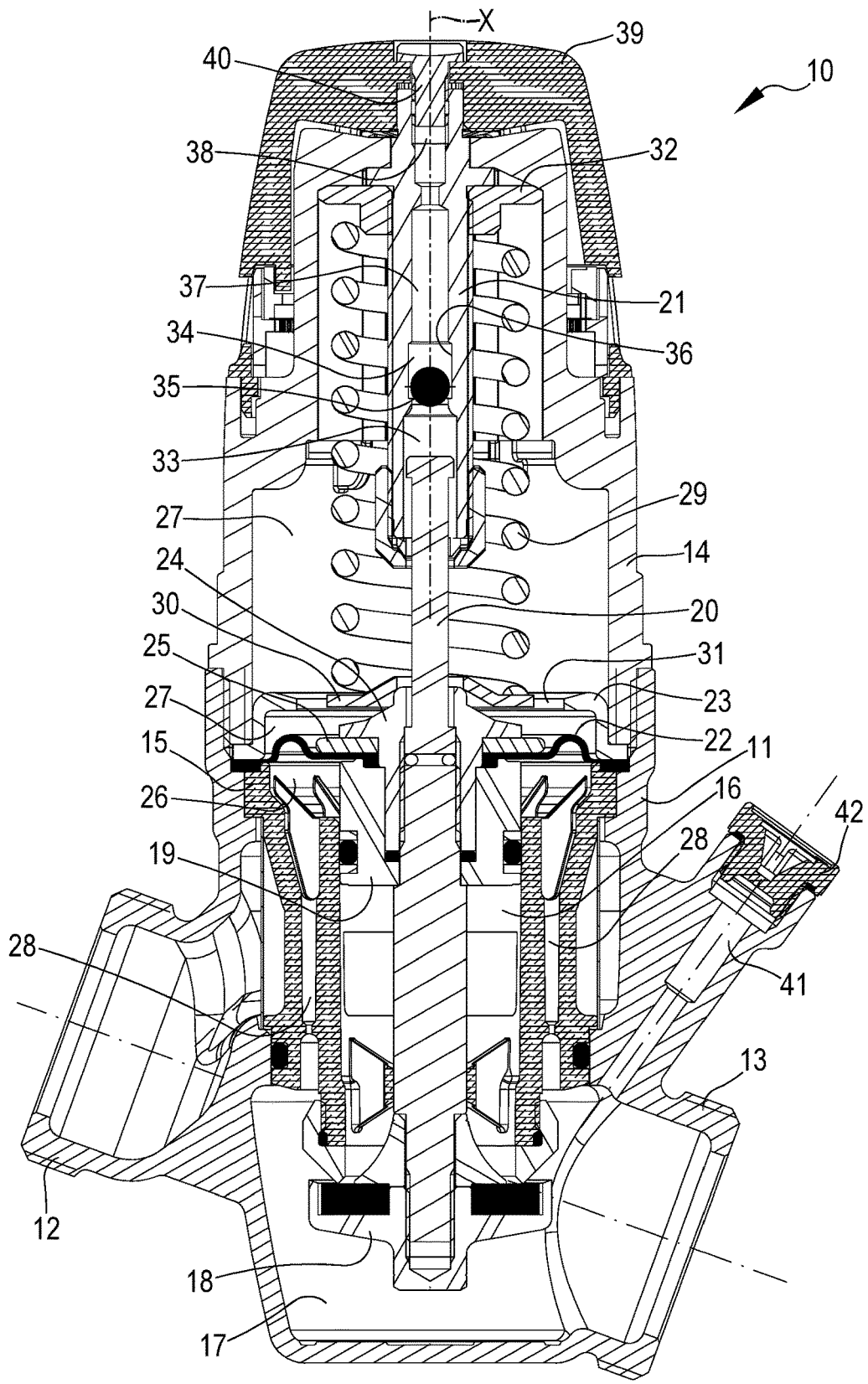
FIG. 1 is an axial section view of a first diaphragm pressure reducer according to the invention.

The diaphragm pressure reducer illustrated in FIG. 1, indicated generically by 10, is intended to be installed in a private water network.

The pressure reducer 10 has a hollow body 11, substantially beaker-shaped, in which a water inlet connection 12 and a water outlet connection 13 are obtained.

The body 11 is sealingly closed above by a bell-shaped cover 14.

Inside the body 11, a hollow insert 15, that has a central conduit 16 directed along the X axis of the pressure reducer 10, is fixed.

The central conduit 16 is in communication with the water inlet connection 12 through suitable inner passages obtained in the insert 15 and leads into a bottom chamber 17 of the body 11 which is in turn in communication with the water outlet connection 13.

The passage of the water from the central conduit 16 to the bottom chamber 17 is adjusted by a shutter 18 that acts on the outlet of the central conduit 16.

For driving the shutter 18, a piston 19 slidable inside the central conduit 16 and connected to the shutter 18 through a rod 20 is provided.

The rod 20 is guided inside a hollow cylinder 21 that is integral with the cover 14 inside the hollow cylinder 21.

On the piston 19, an elastic diaphragm 22 acts that is sealingly fixed, at the edges, to the body 11 by means of a plate 23 and sealingly fixed in a central portion to the piston 19 by means of a bush 24 and a washer 25.

The elastic diaphragm 22 defines inside the diaphragm pressure reducer 10 a lower chamber 26 inside the body 11 and an upper chamber 27 inside the cover 14, that are sealingly separated from the diaphragm 22.

The lower chamber 26 communicates with the bottom chamber 17 through small peripheral conduits 28 parallel to the X axis, that are obtained in the insert 15.

A coil spring 29 acts on the elastic diaphragm 22 through a washer 30 that passes through a central hole 31 of the plate 23. On the opposite side, the spring 29 reacts on another washer, 32, screwed to the guide cylinder 21 in the upper portion of the latter.

Figure 2:
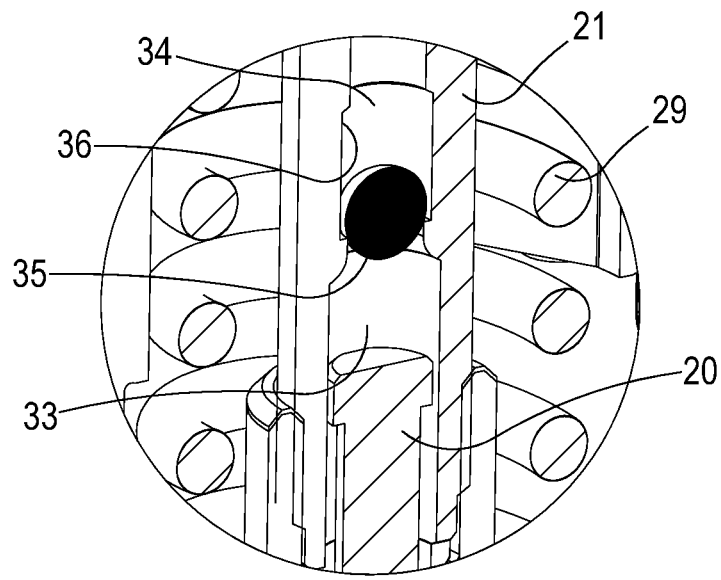
FIG. 2 is an enlarged prospective view m an axial section of a detail of the pressure reducer of FIG. 1.
Figure 3:
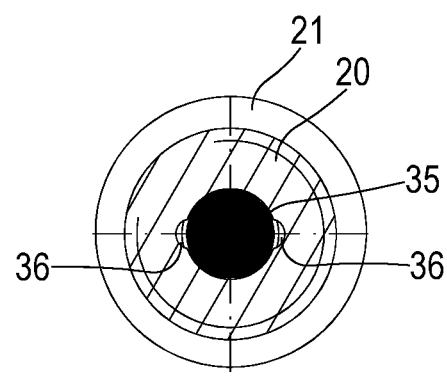
FIG. 3 is a cross section view of the detail of FIG. 2.

The inside of the guide cylinder 21 has a first seat 33 in which an upper portion of the rod 20 is slidable, and a second seat 34, of lesser diameter than the first seat 33. In this second seat 34 an elastically deformable ball 35 is received having greater diameter than the diameter of this second seat 34. As shown in FIGS. 2,3, the seat 34 has longitudinal peripheral channels 36 for the passage of the air. The inside of the cylinder 21 has moreover an air conduit 37 communicating with the seat 34 and of smaller diameter than the latter. The conduit 37 narrows at the upper end and communicates with a threaded hole 38 that opens outside.

On the cover 14 there is mounted an adjustment knob 39 that is fixed to the cylinder 21 by means of a screw 40 that is screwed in the hole 38.

The body 11 also has a transverse conduit 41 that leads outside and is closed by a plug 42.

The operation of the pressure reducer 10 is the following.

When a user is open on the private water network, water flows in the pressure reducer 10 entering through the connection 12, passing through the conduit 16 and the bottom chamber 17 and exiting through the connection 13. The pressure of the water inside the lower chamber 26 acts on one side of the diaphragm 22, the lower chamber 26 being in communication with the bottom chamber 17 through the peripheral conduits 28; the spring 29 acts on the other side of the diaphragm 22. The force of the spring, that determines the calibration of the pressure reducer 10, overrides the contrary force of the pressure of the water acting on the diaphragm 22 and the shutter 18 is in the open position for the passage of the water from the conduit 16 to the bottom chamber 17. The greater the demand for water, the greater will be the reduction of the pressure acting on the diaphragm 22, thus determining a very high fluid passage through the shutter 18.

When the user is completely closed, the pressure downstream of the pressure reducer 10 rises and the diaphragm 22 pushes the shutter 18 to the closed position, preventing the water from passing and thus maintaining the pressure of the water in the private water network constant at a set calibration value.

Inside the chamber 27, air is present, which most always be at atmospheric pressure for the correct operation of the diaphragm 22. When the diaphragm 22 expands inside the chamber 27 pushed by the pressure of the water, to remain at atmospheric pressure the air can vent outside through the seat 33, the peripheral channels 36 of the seat 34, the conduit 37, and the threaded coupling between the hole 38 and the screw 40.

Figure 4:
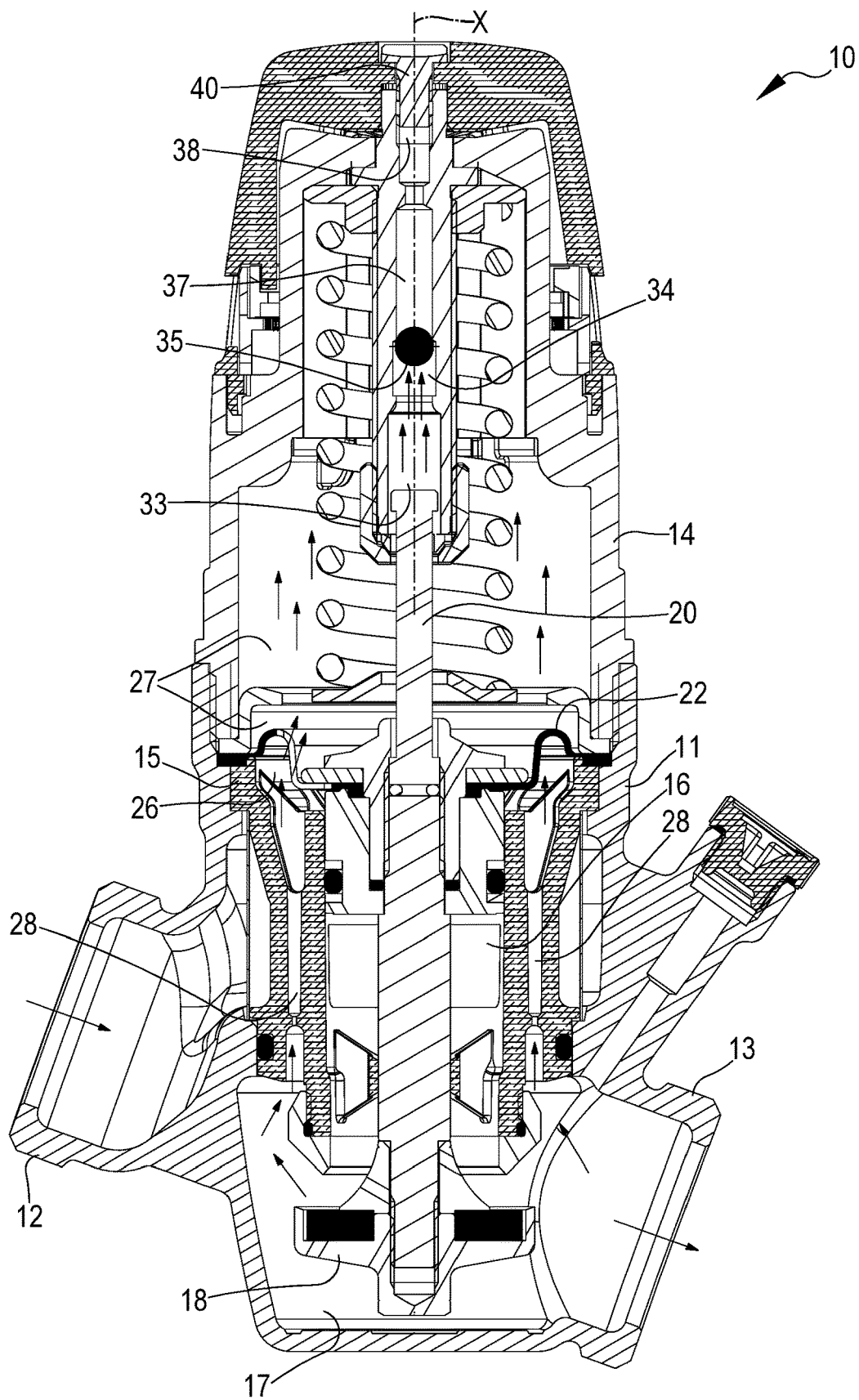
FIGS. 4,5 show in sequence the pressure reducer of FIG. 1 in the situation of rupture of the diaphragm.
Figure 5:
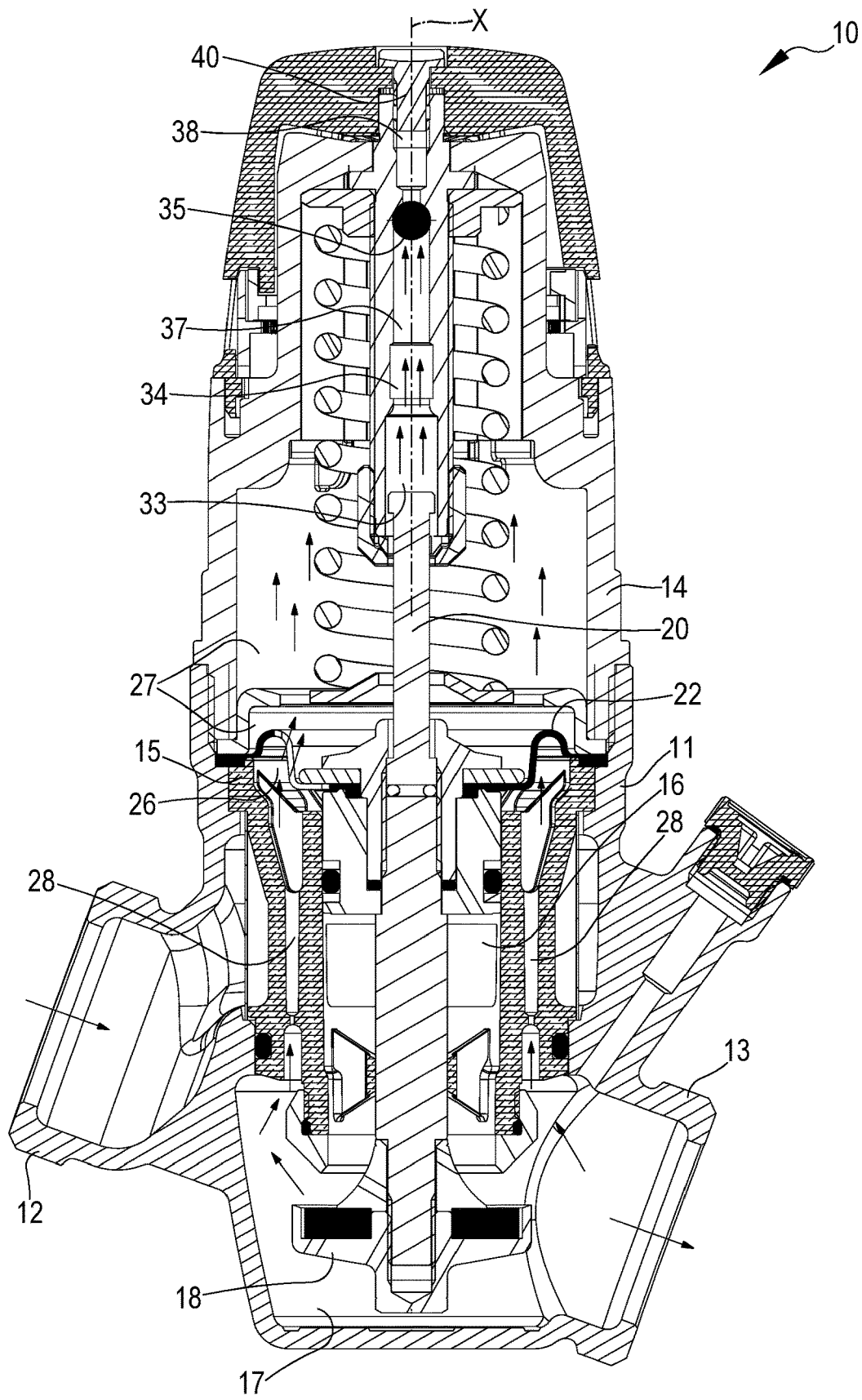

As shown in FIGS. 4,5, if the rupture of the diaphragm 22 occurs, the water penetrates the chamber 27 and rises along the seats 33, 34 and the conduit 37 pushing the ball 35 upwards until the ball 35 is fitted elastically in the narrowing of the conduit 37 at the upper end of the conduit 37.

The elastic fitting of the ball 35 closes the communication gap with the hole 38, preventing the water from exiting to the outside through the threaded coupling between the hole 38 and the screw 40.

In this manner, a water leak from the pressure reducer 10 is prevented in the accidental event of a rupture of the diaphragm 22 without using external devices.

This is also obtained simply, constructionally cheaply and reliably.

In order to measure the pressure of the water at the bottom chamber 17 of the pressure reducer 10, the plug 42 can be removed and the connector of a pressure gauge can be inserted into the seat thereof, that pressure gauge is thus connected to the bottom chamber 17 through the conduit 41.

Figures 6, 7:
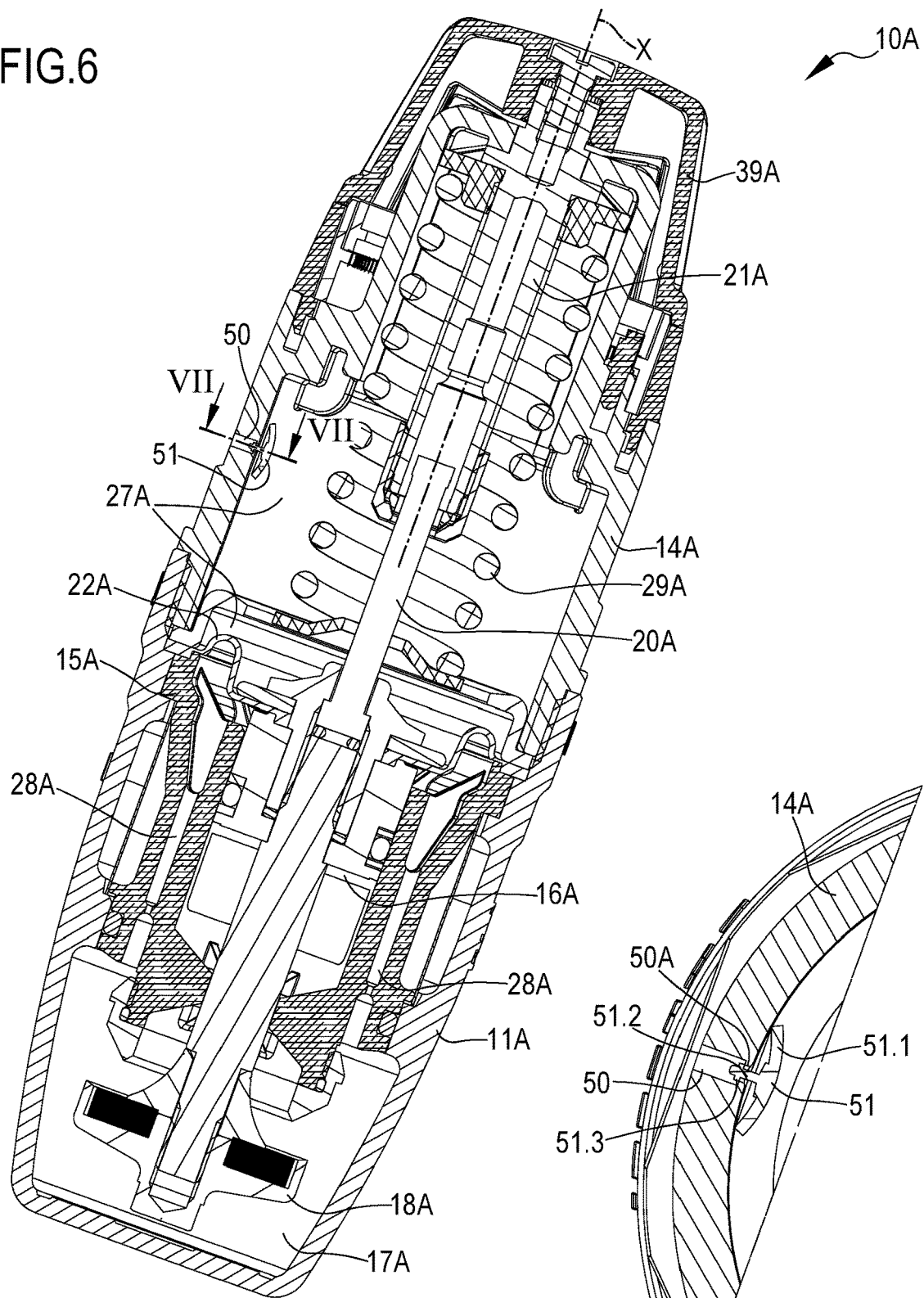
FIG. 6 is an axial section view, rotated by 90° around the axis with respect to the view of FIG. 1, of a second diaphragm pressure reducer according to the invention.
FIG. 7 is an enlarged cross section view, according to the line VII-VII of FIG. 6, of a detail of the pressure reducer of FIG. 6.

The diaphragm pressure reducer illustrated in FIG. 6, indicated generically by 10A, has a structure substantially corresponding to the pressure reducer 10 of FIG. 1, and for this reason the same reference numbers as for the pressure reducer 10 followed by the letter A are used.

The normal operation of the pressure reducer 10A is exactly that seen for the pressure reducer 10.

In order to vent the air, with particular reference to FIG. 7, in the pressure reducer 10A there is an exhaust hole 50 obtained in the cover 14A. On the hole 50, an elastically deformable plug 51 acts, with a substantially T-shaped section, consisting of an arched head 51.1 and of a rectilinear stem 51.2. The stem 51.2 is inserted into the exhaust hole 50 and has an annular projection 51.3 which interacts with a narrowing 50A of the exhaust hole 50 to keep the plug 51 constrained on the hole 50. The arched head 51.1 rests on the wall of the cover 14A in which the hole 50 is obtained.

During normal operation of the pressure reducer 10A the air present in the chamber 27A, in case of pressure that is greater than atmospheric pressure, vents outside through the passage that forms between the plug 51 and the hole 50, the plug 51 being simply retained on the hole 50.

If the rupture of the diaphragm 22A occurs, with reference to FIGS. 8, 9, the pressurized water that flows into the chamber 27A pushes the head 51.1 of the plug 51 against the inner wall of the cover 14A, as well shown in FIG. 9 where it is shown the deformation of the head 51.1 that goes to adhere to the aforesaid inner wall. In this manner, the plug 51 closes the hole 50, preventing the water from exiting the pressure reducer 10A.

Also in this case, external devices are not used to prevent the exit of water in the event of rupture of the diaphragm and this is obtained simply, constructionally cheaply and reliably.

In general, it is possible to provide in the diaphragm pressure reducer an elastically deformable element inserted into the air vent passage, that, during normal operation of the pressure reducer, enables the air to flow in the vent passage and, in the event of rupture of the diaphragm, is deformed through the thrust of the water pressure so as to shut the aforesaid air vent passage.

In the embodiment of FIG. 1, the longitudinal peripheral channels 36 for the passage of the air can also be omitted.

The invention claimed is:

1. Pressure reducer of the diaphragm type internally including a shutter connected with a rod in a guide cylinder regulating a fluid passage between an inlet and an outlet, wherein the shutter is pushed to open by a spring which is contrasted by an elastic diaphragm on which the fluid pressure acts to push the shutter to close, wherein the diaphragm is interposed between two inner chambers of the pressure reducer and divides them sealingly, wherein the pressurized fluid acting on the diaphragm is present in a first chamber and a second chamber is in communication with the outside through an air vent passage arranged in the guide cylinder, including a ball-shaped elastically deformable element arranged at the air vent passage inside the pressure reducer, wherein the elastically deformable element during normal operation of the pressure reducer enables air to flow in the air vent passage, and in the event of rupture of the diaphragm through the thrust of the fluid pressure is deformed so as to shut the aforesaid air vent passage.

2. Pressure reducer according to claim 1, wherein the air vent passage is cylindrical and the ball element is received in a seat of the air vent passage, and wherein the air passage reduces progressively in diameter to determine in the event of rupture of the diaphragm the elastic deformation of the ball element and elastic fitting thereof inside the air vent passage to shut the air vent passage.

3. Pressure reducer according to claim 2, wherein the seat has peripheral channels for the air passage.

4. Pressure reducer according to claim 1, wherein the inside of the guide cylinder has a first seat in which an upper portion of the rod is slidable and a second seat, of lesser diameter than the first seat in which the ball element is received, having a greater diameter than the diameter of the second seat, wherein the inside of the guide cylinder has moreover an air conduit communicating with the second seat and having a lesser diameter than the diameter of the second seat, and wherein the conduit narrows at the upper end and communicates with a threaded hole that opens outside and is coupled with an external fixing screw of a component of the pressure reducer.

5. Pressure reducer according to claim 4, wherein the component is a knob for adjusting the spring preload.

* * * * *